US012789612B2

(12) United States Patent
Park et al.

(10) Patent No.: US 12,789,612 B2
(45) Date of Patent: Nov. 10, 2026

(54) VEHICLE FRAME FOR FUEL CELL AND VEHICLE INCLUDING THE SAME

(71) Applicants: HYUNDAI MOTOR COMPANY, Seoul (KR); KIA CORPORATION, Seoul (KR)

(72) Inventors: Ju Il Park, Seoul (KR); Hai Yao, Shandong Sheng (CN)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 233 days.

(21) Appl. No.: 18/800,397

(22) Filed: Aug. 12, 2024

(65) Prior Publication Data

US 2025/0303839 A1 Oct. 2, 2025

(30) Foreign Application Priority Data

Mar. 27, 2024 (KR) ........................ 10-2024-0041855

(51) Int. Cl.

| | |
|---|---|
| ***B60K 1/04*** | (2019.01) |
| ***B60K 15/07*** | (2006.01) |
| ***B60L 50/71*** | (2019.01) |
| ***B60L 50/75*** | (2019.01) |
| ***B62D 21/02*** | (2006.01) |
| ***H01M 8/04082*** | (2016.01) |
| ***H01M 16/00*** | (2006.01) |

(52) U.S. Cl.

CPC ................ *B60K 1/04* (2013.01); *B60K 15/07* (2013.01); *B60L 50/71* (2019.02); *B60L 50/75* (2019.02); *B62D 21/02* (2013.01); *H01M 8/04201* (2013.01); *H01M 16/006* (2013.01); *B60K 2001/0438* (2013.01); *H01M 2250/20* (2013.01); *H01M 2250/402* (2013.01)

(58) Field of Classification Search

CPC .............. B60K 1/04; B60K 2001/0405; B60K 2001/0438; B60K 15/07; B60K 15/03; B60K 15/03006; B60K 2015/03118; B60K 2015/03309; B60K 2015/03315; B60K 2015/0634; B60L 50/70; B60L 50/71; B60L 50/75; B62D 21/02; B62D 21/18; H01M 8/04201; H01M 16/006; H01M 2250/20; H01M 2250/402

See application file for complete search history.

(56) References Cited

U.S. PATENT DOCUMENTS

2024/0300335 A1 * 9/2024 Oko .......................... B60L 7/22

FOREIGN PATENT DOCUMENTS

| | | | | |
|---|---|---|---|---|
| CN | 111619373 A | * | 9/2020 | B60K 1/00 |
| CN | 115042861 A | * | 9/2022 | B60K 15/07 |

* cited by examiner

*Primary Examiner* — Timothy Hannon

(74) *Attorney, Agent, or Firm* — MCDONNELL BOEHNEN HULBERT & BERGHOFF LLP

(57) ABSTRACT

A vehicle frame for a fuel cell includes a first frame, a second frame, and a support frame interconnecting the first frame and the second frame and provided with a fluid tank and a battery mounted thereon. The fluid tank includes a pair of fluid tanks on outer sides of the first frame and the second frame in a width direction, and the battery is disposed between the pair of fluid tanks.

17 Claims, 6 Drawing Sheets

VEHICLE FRAME FOR FUEL CELL AND VEHICLE INCLUDING THE SAME

CROSS REFERENCE TO RELATED APPLICATIONS

This application claims benefit of priority to Korean Patent Application No. 10-2024-0041855 filed on Mar. 27, 2024 in the Korean Intellectual Property Office, the disclosure of which is incorporated herein by reference in its entirety.

BACKGROUND

1. Field

The present disclosure relates to a vehicle frame for a fuel cell and a vehicle having the same.

2. Description of Related Art

As vehicles using internal combustion engines of the related art emit large amounts of global warming substances, and the like, and thus, the problem of environmental pollution continues to rise, continuous research and development is being undertaken to drive vehicles using forms of alternative energy.

In addition, recently, a structure has been proposed that provides power to a vehicle by driving a motor using a secondary battery, and in detail, electric vehicles using fuel (for example, hydrogen, or the like) stored in a (high-pressure) fuel tank have been proposed.

However, to use the fuel used in the fuel tank, a bulky fuel tank should be installed in the vehicle body or frame (chassis), and thus, there may be a problem in that space should be sufficiently utilized and rigidity of the vehicle should be secured at the same time.

SUMMARY

An aspect of the present disclosure is to provide a vehicle frame structure in which sufficient space for installation and maintenance of a fuel tank and a battery provided in a vehicle (or truck) may be sufficiently secured.

According to an aspect of the present disclosure, a vehicle frame for a fuel cell includes a first frame, a second frame, and a support frame interconnecting the first frame and the second frame and provided with a fluid tank and a battery mounted thereon. The fluid tank is provided as a pair of fluid tanks on outer sides of the first frame and the second frame in a width direction, and the battery is disposed between the pair of fluid tanks.

The first frame may include a pair of first side frames, and at least one first cross-member connecting the pair of first side frames, and the second frame may include a pair of second side frames, and at least one second cross-member connecting the pair of second side frames.

The support frame may include a pair of third side frames respectively provided on outer sides of the pair of first side frames and the pair of second side frames in the width direction, and a third cross-member extending from the pair of third side frames and provided with the battery and the pair of fluid tanks installed thereon.

The third cross-member may be coupled to an auxiliary frame extending downwardly from the pair of third side frames.

The auxiliary frame may be coupled to the pair of first side frames and the pair of second side frames, respectively, and the pair of third side frames may be coupled to the auxiliary frame.

The third cross-member may be provided with the battery installed on an inside based on the auxiliary frame and may be provided with the fluid tank installed on an outside thereof.

The pair of first side frames, the pair of second side frames, and the pair of third side frames may be coupled to be provided on the same virtual first plane.

The pair of first side frames, the pair of second side frames, the pair of third side frames, the first cross-member, and the second cross-member may be coupled to be provided on the same second virtual plane.

The battery may be disposed to at least partially overlap the second plane.

The third cross-member may be provided so as not to overlap the first plane.

The third cross-member may include a bent member directly supporting the fluid tank.

The vehicle frame for a fuel cell may include a cage surrounding the fluid tank, and the cage may have an insertion portion in a position in which the fluid tank may be supported on the bent member.

According to an aspect of the present disclosure, a vehicle includes the vehicle frame for a fuel cell according to an embodiment; and a body coupled to an upper portion of the vehicle frame.

Between a lower surface of the body and the battery, a space with an expanded width greater than a width-direction spacing between the pair of first side frames of the first frame or a width-direction spacing between the pair of second side frames of the second frame may be secured.

A length of the expanded width in a width direction may be equal to a width-direction spacing between the pair of third side frames of the support frame.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
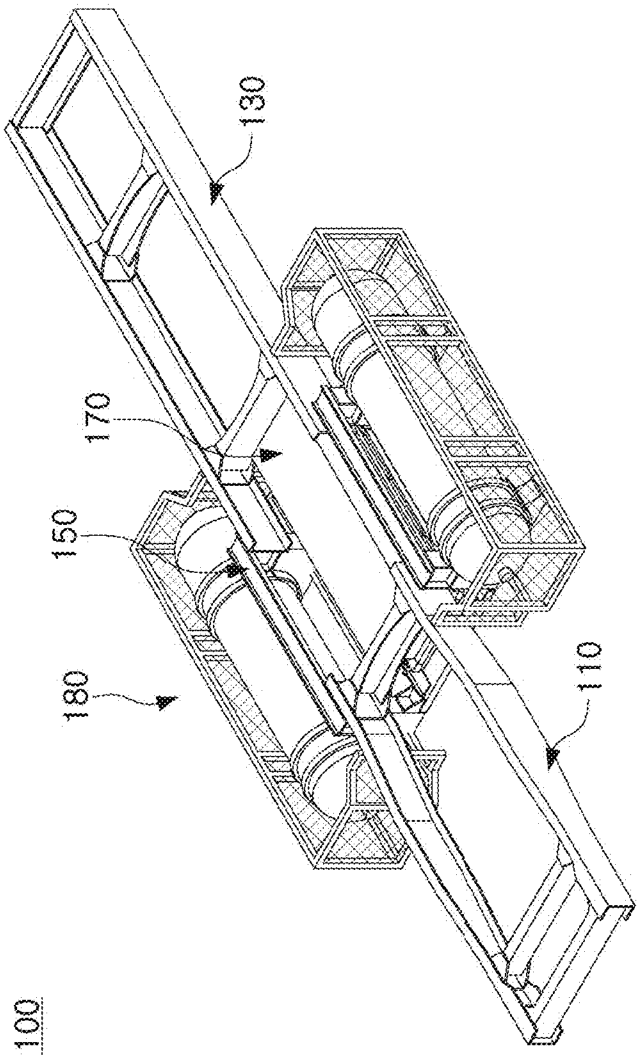
FIG. 1 is a combined perspective view of a vehicle frame for a fuel cell according to an embodiment.

Since the present disclosure may make various changes and have various embodiments, specific embodiments will be illustrated in the drawings and described in detail. However, this is not intended to limit the present disclosure to specific embodiments, and should be understood to include all changes, equivalents, and substitutes included in the spirit and technical scope of the present disclosure.

Terms such as first, second, and the like may be used to describe various components, but the components should not be limited by the terms. The above terms are used only for the purpose of distinguishing one component from another. For example, a first component may be named a second component, and similarly, the second component may also be named a first component without departing from the scope of the present disclosure. The term 'and/or' includes any combination of a plurality of related stated items or any of a plurality of related stated items.

Terms such as "unit, part, portion and the like" may be used to describe various components, but the components should not be limited by the terms. The above term may refer to not only a physically/visually distinct configuration, but also a term that describes the function or configuration of the corresponding part even if the distinction/division is not clear.

The terms used in this application are only used to describe specific embodiments and are not intended to limit the present disclosure. Singular expressions include plural expressions unless the context clearly dictates otherwise. In this application, terms such as "comprise," "include" and "have" are intended to designate the presence of features, numbers, steps, operations, components, parts, or combinations thereof described in the specification, and it should be understood that this does not exclude in advance the presence or addition of one or more other features, numbers, steps, operations, components, parts, or combinations thereof.

Unless otherwise defined, all terms used herein, including technical or scientific terms, have the same meaning as commonly understood by a person of ordinary skill in the technical field to which the present disclosure pertains. Terms defined in commonly used dictionaries should be interpreted as having meanings consistent with the meanings they have in the context of the relevant technology, and unless explicitly defined in this application, it is not to be interpreted in an idealistic or overly formal sense.

In this specification, a vehicle refers to a variety of vehicles that move transported objects, such as people, animals, or goods, from a starting point to a destination. These vehicles are not limited to vehicles running on roads or tracks. In addition, vehicles not only use fossil fuels such as gasoline and the like, but also include those that use secondary batteries using electricity stored in batteries, or the like, and those that use future fuels such as hydrogen or the like.

In the description below, the terms "anterior," "posterior," "lateral," "front," "back," "up/down," "above," "upper," "top," "below," "lower," "bottom," "left/right," and the like, used in relation to direction, are defined based on the vehicle or body of the car. In addition, terms such as first, second and the like may be used to describe various components, but these components are not limited in order, size, location, or importance by terms such as first, second and the like, and are named only for the purpose of distinguishing one component from other components.

Hereinafter, example embodiments will be described in more detail with reference to the attached drawings.

Referring to FIGS. 1 to 4, a vehicle frame 100 for a fuel cell according to an embodiment includes a first frame 110, a second frame 130, and a support frame 150 that connects the first frame 110 and the second frame 130 to each other.

Hereinafter, the direction in which a pair of side frames 111 and 131 constituting a first frame 110 or a second frame 130 extend is defined as the longitudinal direction, and the direction, which is perpendicular to the longitudinal direction and in which the cross-member connecting a pair of side frames 111 and 131 extends, is defined as the width direction.

Additionally, a fluid tank assembly 180 and a battery assembly 170 may be installed on the support frame 150. The fluid tank assembly 180 may include at least one pair of fluid tanks 181 provided on the outer sides of the first frame 110 and the second frame 130 in the width direction, and the battery assembly 170 may include at least one battery 171 disposed between a pair of fluid tanks 181. In this case, the battery 171 may be a high-voltage battery, and the fluid tank 181 may be a tank that stores high-pressure gas, such as hydrogen or the like.

In the vehicle frame 100 for a fuel cell according to this embodiment, the first frame 110 and the second frame 130 are manufactured separately, and the first frame 110 and the second frame 130 may be connected to each other by the support frame 150. The support frame 150 may be connected to the first frame 110 or the second frame 130 through various member connection methods such as bolting and welding.

The first frame 110, the second frame 130, and the support frame 150 may be formed of metal.

The frame 100 for a fuel cell vehicle in an embodiment may include a first frame 110, a second frame 130, and a support frame 150 which connects the first frame 110 and the second frame 130 to each other and on which the fluid tank 181 and the battery 171 are mounted. A pair of the fluid tanks 181 are provided on the outer sides of the first frame 110 and the second frame 130 in the width direction, and the battery 171 may be disposed between the pair of fluid tanks 181.

The first frame 110 may include a pair of first side frames 111 extending in the longitudinal direction and disposed in parallel, and at least one first cross-member 113 connecting the pair of first side frames 111.

The first side frame 111 and the first cross-member 113 may be formed of a material such as metal, alloy, or the like, and may be coupled to each other by various inter-member connection methods such as mutual welding, bolting (joint using bolts and nuts), rivets, and the like.

In addition, the first cross-member may be provided as one or two or more first cross-members 113 depending on the required rigidity, and in the drawings, a structure in which three first cross-members 113 are provided is illustrated as a representative embodiment.

The first side frame 111 may be provided in various thicknesses and sizes depending on the required rigidity, and to secure sufficient rigidity while being light, a C-shaped beam (steel) with a 'C' cross section may be used. In addition, the first side frame 111 may be provided with at least one or a plurality of holes for weight reduction to lighten the weight.

Figure 2A:
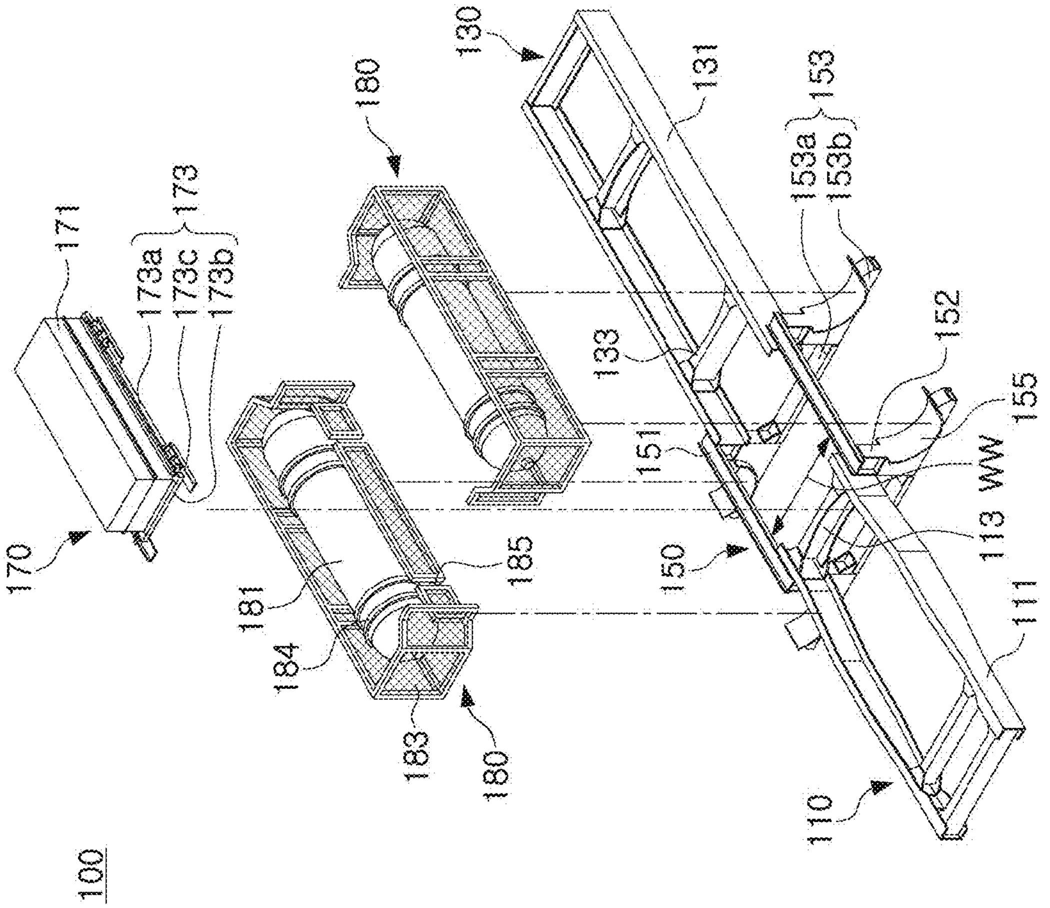
FIGS. 2A and 2B are exploded perspective views of a vehicle frame for a fuel cell according to an embodiment.
Figure 2B:
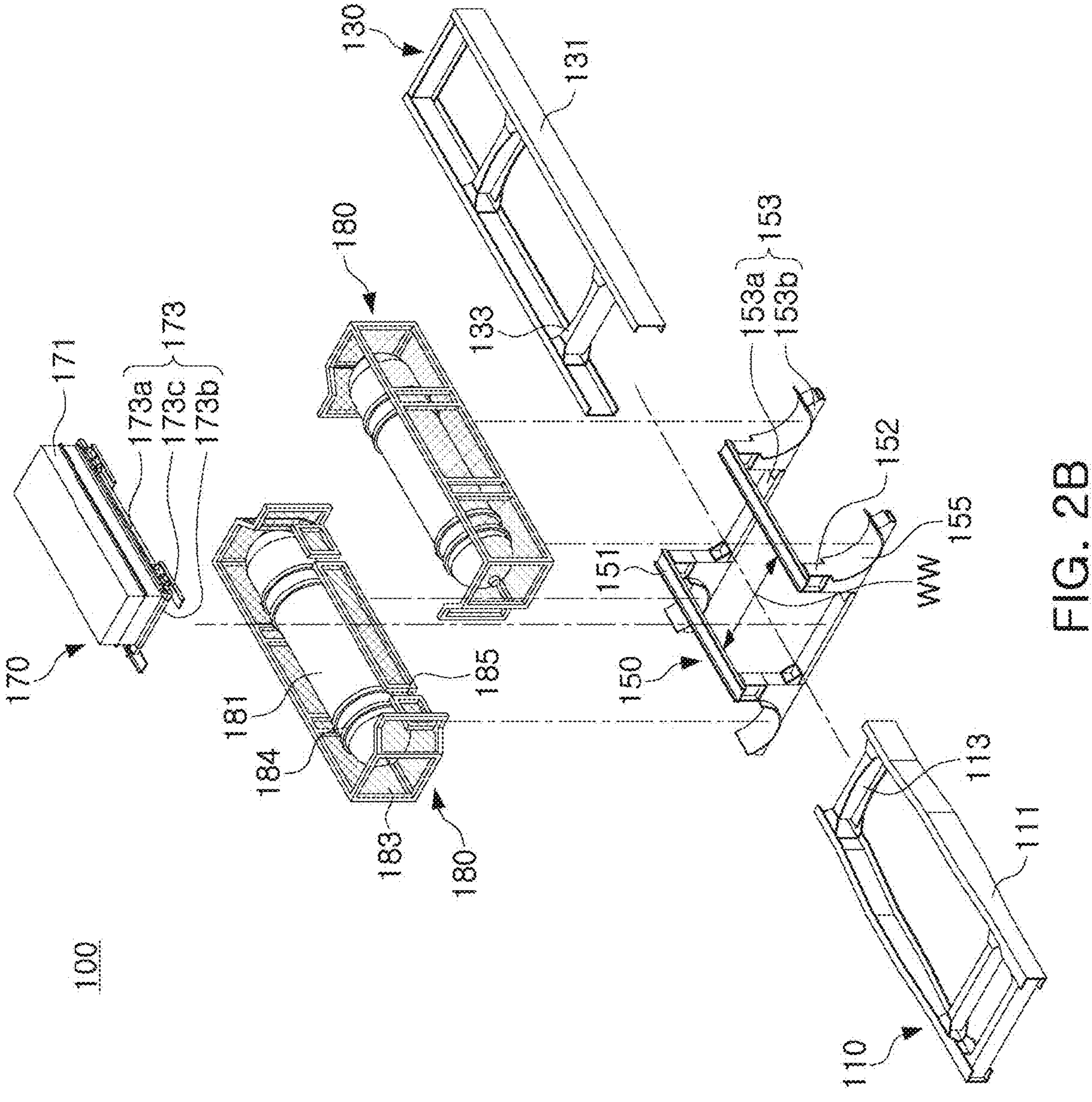
Figure 3:
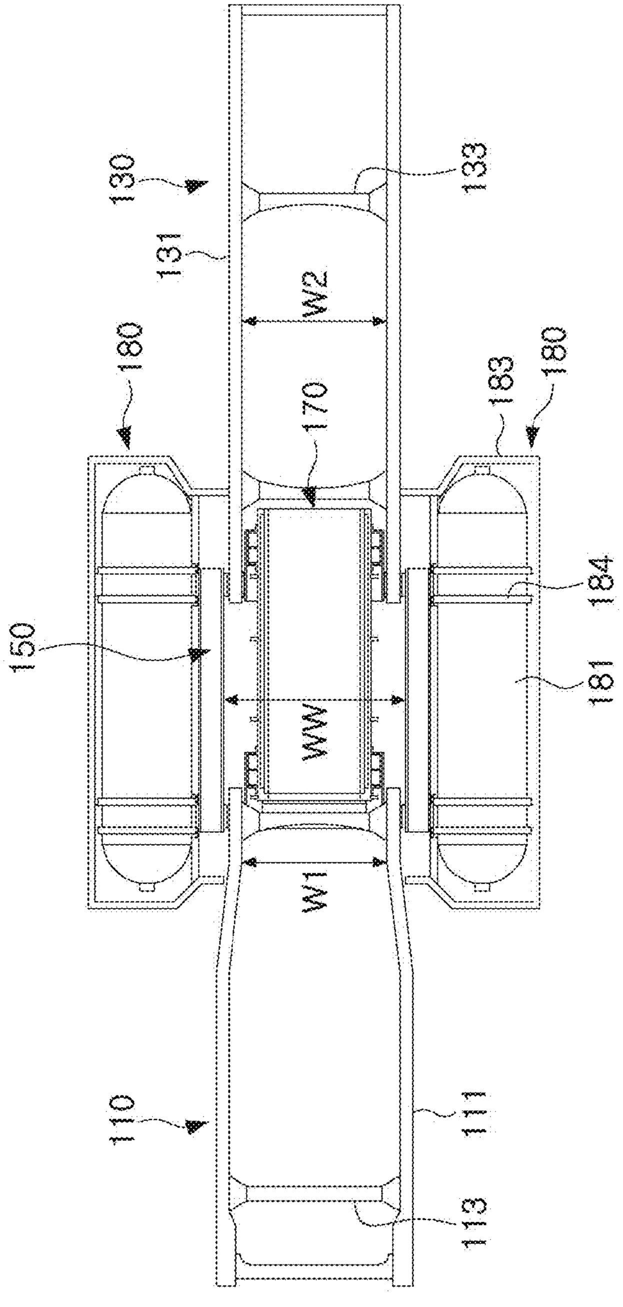
FIG. 3 is a plan view of a vehicle frame for a fuel cell according to an embodiment.

Additionally, as illustrated in FIG. 2, the first side frame 111 may be provided in a shape in which thickness varies in the longitudinal direction.

In addition, the first cross-member 113 may be provided in various thicknesses and sizes depending on the required rigidity, and to secure sufficient rigidity while being light, an I-shaped beam (steel material) with an "I"-shaped cross section may be used. In addition, the first cross-member 113 may be provided with at least one or a plurality of holes for weight reduction to lighten the weight.

Next, the second frame 130 may include a pair of second side frames 131 extending in the longitudinal direction and disposed in parallel, and at least one second cross-member 133 connecting a pair of second side frames 131.

The second side frame 131 and the second cross-member 133 may be formed of a material such as metal, alloy, or the like, and may be coupled to each other by various inter-member connection methods such as mutual welding, bolting (joint using bolts and nuts), and rivets.

In addition, the second cross-member 133 may be provided as one or two or more second cross-members 133 depending on the required rigidity, and in the drawings, a structure provided with three second cross-members 133 is illustrated as a representative embodiment. In addition, the second cross-member 133 may be provided with at least one or a plurality of holes for weight reduction to lighten the weight.

The second side frame 131 may be provided in various thicknesses and sizes depending on the required rigidity, and to secure sufficient rigidity while being light, a ⊏-shaped beam (steel) with a '⊏' cross section may be used. In addition, the second side frame 131 may be provided with at least one or a plurality of holes for weight reduction to lighten the weight.

In addition, although not illustrated, like the first side frame 111, the second side frame 131 may be provided in a shape in which the thickness varies in the longitudinal direction.

In addition, the second cross-member 133 may be provided in various thicknesses and sizes depending on the required rigidity, and an I-shaped beam (steel material) with an 'I'-shaped cross section may be used to ensure lightness and sufficient rigidity.

The support frame 150 connects the first frame 110 and the second frame 130 to each other, and a fluid tank 181 and a battery 171 may be installed thereon.

The support frame 150 may include a pair of third side frames 151 extending in the longitudinal direction, and a third cross-member 153 extending from a pair of third side frames 151, provided long in the width direction and provided with a battery 171 and a pair of fluid tanks 181 installed thereon.

The support frame 150 may be connected to the constituent members by various connection methods such as welding, bolting (joint using bolts and nuts), and rivets.

In addition, the third cross-member 153 may include an auxiliary frame 152 extending downward from the pair of third side frames 151. For example, the third cross-member 153 is connected to the third side frame 151 through the auxiliary frame 152, the third side frame 151 may extend in the longitudinal direction, and the third cross-member 153 may extend in the width direction.

The auxiliary frame 152 may be provided to extend in a direction perpendicular to both the longitudinal and width directions.

The auxiliary frame 152 may be formed of a material such as a metal or an alloy, and may be provided with at least one or a plurality of holes for weight reduction to lighten the weight.

The auxiliary frame 152 may be coupled to a pair of first side frames 111 and a pair of second side frames 131, respectively. For example, the auxiliary frame 152, and the pair of first side frames 111 and the pair of second side frames 131, may be connected to each other, and may be joined by various connecting methods between members, such as welding, bolting (joint using bolts and nuts), and rivets.

On the other hand, although not illustrated, a pair of third side frames 151 are respectively coupled to a pair of first side frames 111 and a pair of second side frames 131, and the auxiliary frame 152 may be respectively coupled to the third side frame 151.

The pair of third side frames 151 may be provided on the outer sides of the pair of first side frames 111 and the pair of second side frames 131 in the width direction, respectively. Accordingly, in the space between the pair of third side frames 151, for example, on the inside, a sufficient space that is longer than the space between the pair of first side frames 111 or the pair of second side frames 131 may be secured.

In addition, the third cross-member 153 connecting the pair of third side frames 151 in the width direction is provided to extend downward through the auxiliary frame 152, and thus, sufficient space for installation and maintenance of the battery 171 may be secured in the space between the pair of third side frames 151 in the width direction.

For example, the pair of first side frames 111, the pair of second side frames 131, and the pair of third side frames 151 may be coupled to be provided on the same virtual first plane, and for example, may be provided on a virtual first plane formed by the intersection of the longitudinal direction and the width direction. Additionally, the third cross-member 153 may be provided on another plane that does not overlap the first plane.

Furthermore, in addition to a pair of first side frames 111, a pair of second side frames 131, and a pair of third side frames 151, the first cross-member 113 and the second cross-member 133 may also be provided on the same virtual second plane, and for example, may be provided on a virtual second plane formed by the intersection of the longitudinal direction and the width direction. The first plane and the second plane may be substantially the same plane. In this case as well, the third cross-member 153 may be provided on another plane that does not overlap the first plane.

The battery 171 may be installed on the third cross-member 153 on the inside based on the auxiliary frame 152, and the fluid tank 181 may be installed on the outside. For example, the battery 171 and a pair of fluid tanks 181 may be installed on the third cross-member 153.

The battery 171 may be disposed to at least partially overlap the first or second plane. The battery 171 is installed between a pair of third side frames 151, and in more detail, the battery 171 may be installed on the upper portion of the third cross-member 153*a*-153 connecting the pair of third side frames 151 in the width direction. In addition, the third cross-member 153 is provided on another plane (provided further below) that does not overlap the first plane, and accordingly, the battery 171 may secure sufficient installation space up to a position overlapping the first or second plane.

Figure 4:
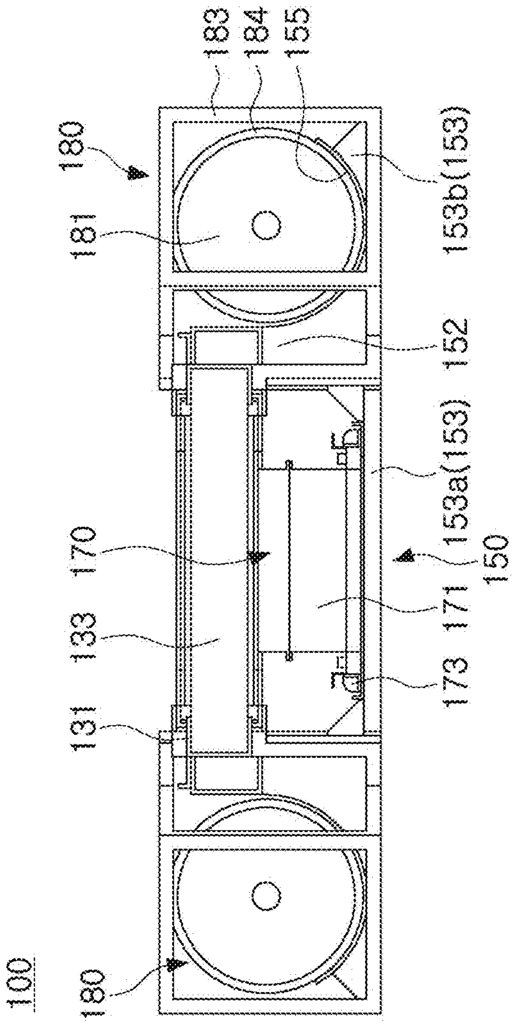
FIG. 4 is a front view of a vehicle frame for a fuel cell according to an embodiment.

In detail, the battery 171 may be disposed (installed) to at least partially overlap the first or second plane, and accordingly, the battery 171 may be installed to overlap a pair of first side frames 111, a pair of second side frames 131, a pair of third side frames 151, the first cross-member 113 or the second cross-member 133 (refer to the front view in FIG. 4).

For example, as will be described below with reference to FIG. 5, between the lower surface of a vehicle body 200 and the battery 171, a space with an expanded width WW greater than a width direction spacing W1 of the pair of first side frames 111 of the first frame 110 or a width direction spacing W2 of the pair of second side frames 131 of the second frame 130 may be secured. Accordingly, installation and maintenance of the battery 171 may be significantly facilitated. The width direction length of the expanded width WW may be equal to the width direction spacing between the pair of third side frames 151 of the support frame 150.

The battery 171 may be installed so that both ends thereof in the longitudinal direction are disposed between a pair of first side frames 111 and a pair of second side frames 131.

The third cross-member 153 may include a 3*a* cross-member 153*a* provided between a pair of third side frames 151, and two 3*b* cross-members 153*b* provided respectively on the outer sides of the third side frames 151.

A battery assembly 170 including a battery 171 is installed on the 3*a* cross-member 153*a*, and a fluid tank assembly 180 may be installed on the 3*b* cross-member 153*b*. Additionally, the 3*b* cross-member 153*b* may be provided with a bent member 155 that directly supports the fluid tank 181. The bent member 155 may be provided in a bent form to have a corresponding curvature in consideration of the curvature of the fluid tank 181.

The battery assembly 170 may include a battery support member 173 and the battery 171 provided on the battery support member 173. The battery support member 173 may include a pair of fourth side frames 173*a* extending in the longitudinal direction, and at least one cross-member 173*b* connecting the pair of fourth side frames 173*a* in the width direction. In addition, a pair of fourth side frames 173*a* may be fixed to the 3*a* cross-member 153*a*.

However, for convenience of installation, and the like, the battery support member 173 may further include a fixing member 173*c* extending in the longitudinal direction from the pair of fourth side frames 173*a*, and the fixing member 173*c* may be fixed to the 3*a* cross-member 153*a*.

The fluid tank assembly 180 includes a fluid tank 181, and the fluid tank 181 may be firmly fixed to the cage 183 using a fixing strip 184. The cage 183 may be fixedly installed on the third cross-member 153. The cage 183 may be coupled to the third cross-member 153.

The fluid tank assembly 180 may include the cage 183 surrounding the fluid tank 181. Additionally, the fluid tank 181 may be directly supported on the bent member 155 of the third cross-member 153. Accordingly, the cage 183 may be provided with an insertion portion 185 through which the bent member 155 penetrates. For example, the cage 183 may be provided with an open (or partially cut) insertion portion 185 in a position where the fluid tank 181 is supported by the bent member 155.

Figure 5:
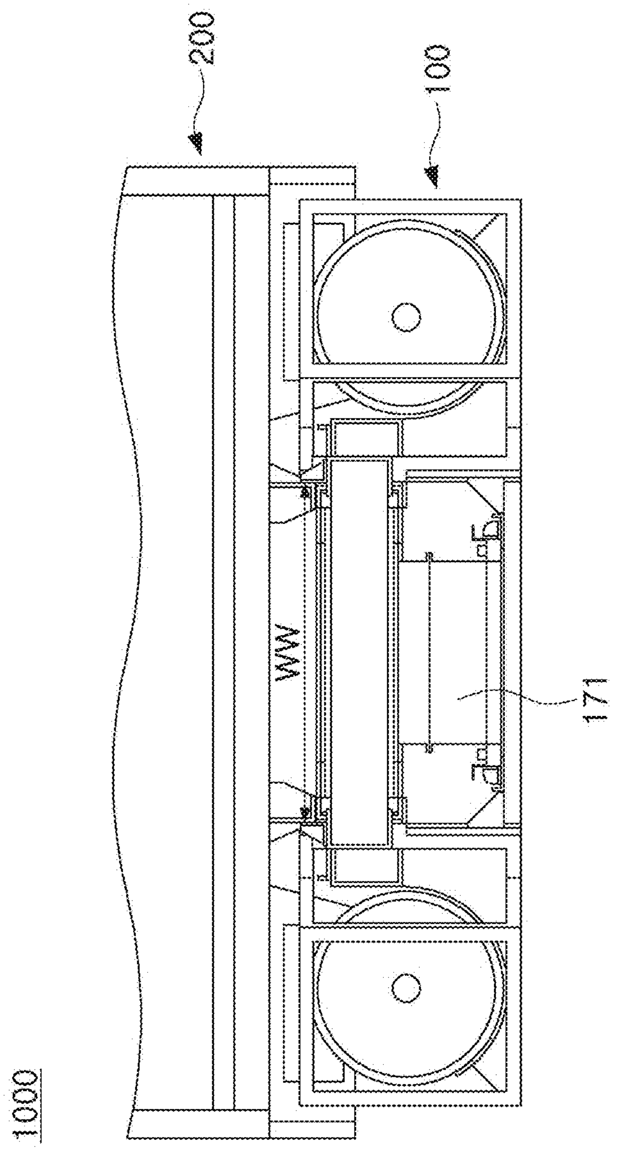
FIG. 5 is a reference diagram (front view) illustrating a car body coupled to a vehicle frame for a fuel cell according to an embodiment.

Referring to FIG. 5, a vehicle 1000 according to an embodiment may include a vehicle frame 100 for a fuel cell according to this embodiment and a body 200 coupled thereto.

The body 200 may be coupled to the upper portion of the vehicle frame 100 for a fuel cell.

Between the lower surface of the vehicle body 200 and the battery 171, a space with an expanded width WW greater than the width direction spacing W1 of the pair of first side frames 111 of the first frame 110 or the width direction spacing W2 of the pair of second side frames 131 of the second frame 130 may be secured. Accordingly, installation and maintenance of the battery 171 may be significantly facilitated.

The width direction length of the expanded width WW may be equal to the width direction spacing between the pair of third side frames 151 of the support frame 150.

As set forth above, a vehicle frame for a fuel cell according to an embodiment and a vehicle equipped with the same may be designed to secure installation space for a fuel tank and a battery, thereby providing a vehicle that is easy to design and maintain with sufficient space.

While example embodiments have been illustrated and described above, it will be apparent to those skilled in the art that modifications and variations could be made without departing from the scope of the present disclosure as defined by the appended claims.

The invention claimed is:

1. A vehicle frame for a fuel cell, comprising:

a first frame;

a second frame; and a support frame interconnecting the first frame and the second frame, the support frame including a pair of fluid tanks and a battery mounted thereon;

wherein the fluid tanks are positioned on outer sides of the first frame and the second frame in a width direction, respectively, and the battery is positioned between the pair of fluid tanks;

wherein the first frame includes a pair of first side frames; and the second frame includes a pair of second side frames;

wherein the support frame includes:

a pair of third side frames each positioned on an outer side of the pair of first side frames and the pair of second side frames in the width direction.

2. The vehicle frame for a fuel cell of claim 1, wherein the first frame includes at least one first cross-member connecting the pair of first side frames; and wherein the second frame includes at least one second cross-member connecting the pair of second side frames.

3. The vehicle frame for a fuel cell of claim 2, wherein the support frame includes:

a third cross-member extending from each of the pair of third side frames and having the battery and the pair of fluid tanks positioned thereon.

4. The vehicle frame for a fuel cell of claim 3, wherein the third cross-member is coupled to an auxiliary frame extending downwardly from the pair of third side frames.

5. The vehicle frame for a fuel cell of claim 4, wherein the auxiliary frame is coupled to the pair of first side frames and the pair of second side frames, and wherein the pair of third side frames are coupled to the auxiliary frame.

6. The vehicle frame for a fuel cell of claim 4, wherein the battery is positioned on an inside of the third cross-member based on the auxiliary frame, and wherein each fluid tank of the pair of fluid tanks is positioned on an outside of the third cross member.

7. The vehicle frame for a fuel cell of claim 3, wherein the pair of first side frames, the pair of second side frames, and the pair of third side frames are coupled together and positioned on a same virtual first plane.

8. The vehicle frame for a fuel cell of claim 7, wherein the third cross-member does not to overlap the first virtual plane.

9. The vehicle frame for a fuel cell of claim 3, wherein the third cross-member includes a respective bent member directly supporting each of the pair of fluid tanks.

10. The vehicle frame for a fuel cell of claim 9, comprising a respective cage surrounding each of the pair of fluid tanks, wherein the respective cage has an insertion portion in a position in which each of the pair of fluid tanks are supported on the respective bent member.

11. The vehicle frame for a fuel cell of claim 2, wherein the pair of first side frames, the pair of second side frames, the pair of third side frames, the first cross-member, and the second cross-member are coupled together and positioned on a same second virtual plane.

12. The vehicle frame for a fuel cell of claim 11, wherein the battery at least partially overlaps the second virtual plane.

13. A vehicle comprising:

the vehicle frame for the fuel cell according to claim 1; and a body coupled to an upper portion of the vehicle frame.

14. The vehicle of claim 13, wherein between a lower surface of the body and the battery, a space with an expanded width greater than a width-direction spacing between the pair of first side frames of the first frame or a width-direction spacing between the pair of second side frames of the second frame is secured.

15. The vehicle of claim 14, wherein a length of the expanded width in a width direction is equal to a width-direction spacing between the pair of third side frames of the support frame.

16. A vehicle comprising:

a vehicle frame for a fuel cell; and a body coupled to an upper portion of the vehicle frame;

wherein the vehicle frame for a fuel cell comprises:

a first frame;

a second frame; and a support frame interconnecting the first frame and the second frame, the support frame including a pair of fluid tanks and a battery mounted thereon;

wherein the fluid tanks are positioned on outer sides of the first frame and the second frame in a width direction, and the battery is positioned between the pair of fluid tanks; and wherein between a lower surface of the body and the battery, a space with an expanded width greater than a width-direction spacing between the pair of first side frames of the first frame or a width-direction spacing between the pair of second side frames of the second frame is secured.

17. The vehicle of claim 16, wherein a length of the expanded width in a width direction is equal to a width-direction spacing between the pair of third side frames of the support frame.

* * * * *